A. A. STRANGE & W. ANDERSON.
TROLLEY POLE OPERATING MEANS.
APPLICATION FILED AUG. 12, 1909.
991,039.
Patented May 2, 1911.
3 SHEETS—SHEET 1.
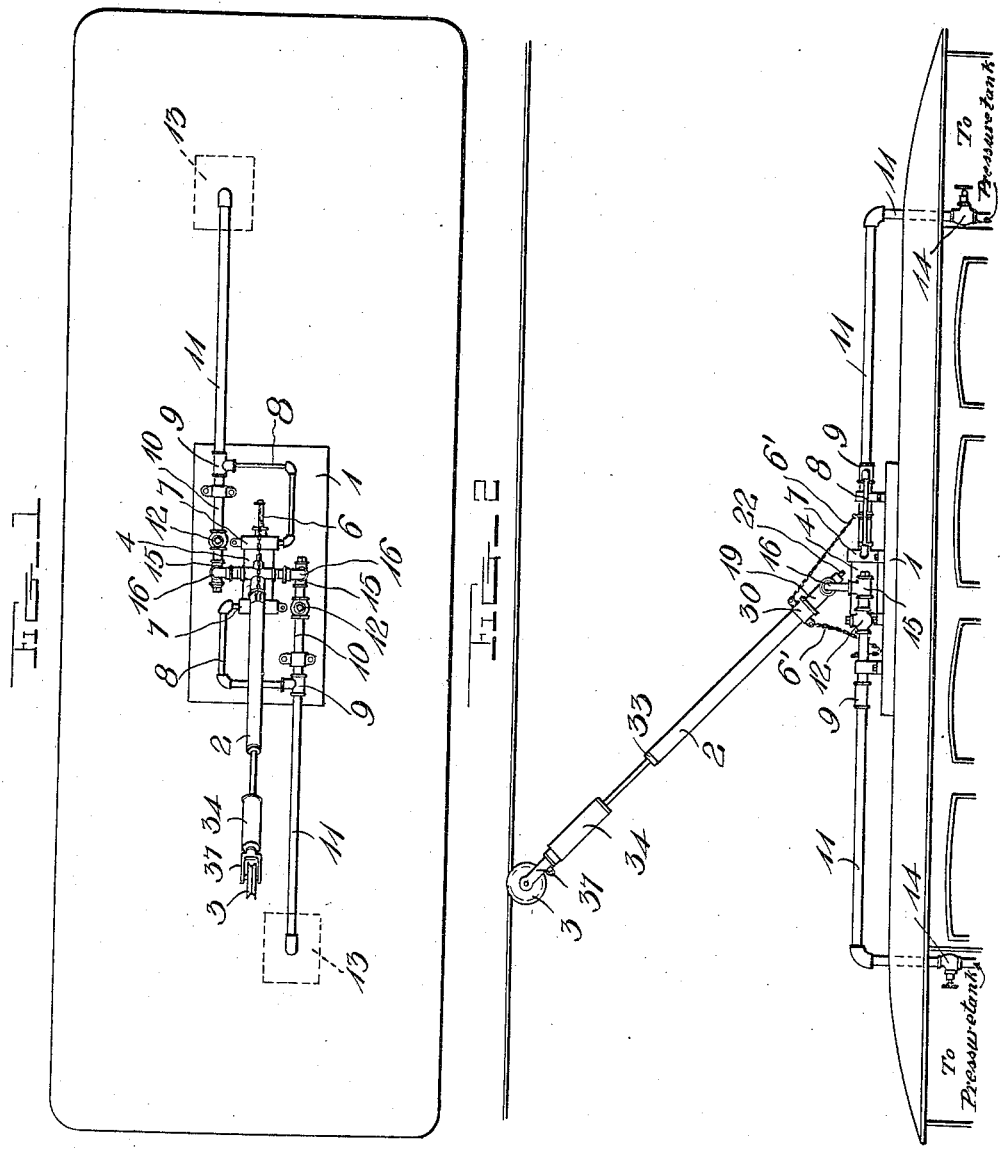
Witnesses
C. H. Griesbauer
Inventors
A. A. Strange
and W. Anderson
by H. B. Willson & Co.
Attorneys
THE NORRIS PETERS CO., WASHINGTON, D. C.

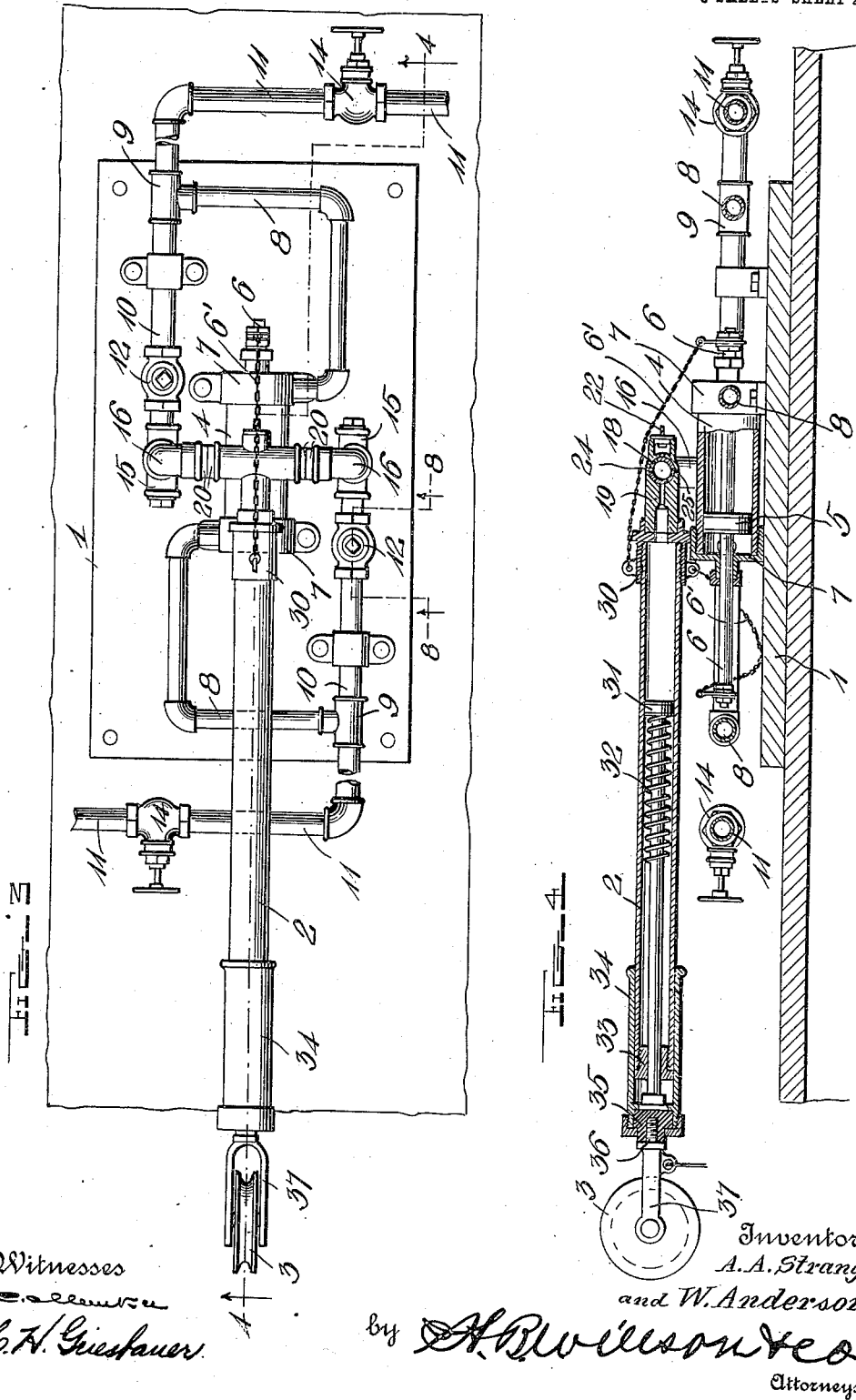

A. A. STRANGE & W. ANDERSON.
TROLLEY POLE OPERATING MEANS.
APPLICATION FILED AUG. 12, 1909.
991,039.
Patented May 2, 1911.
3 SHEETS—SHEET 3.
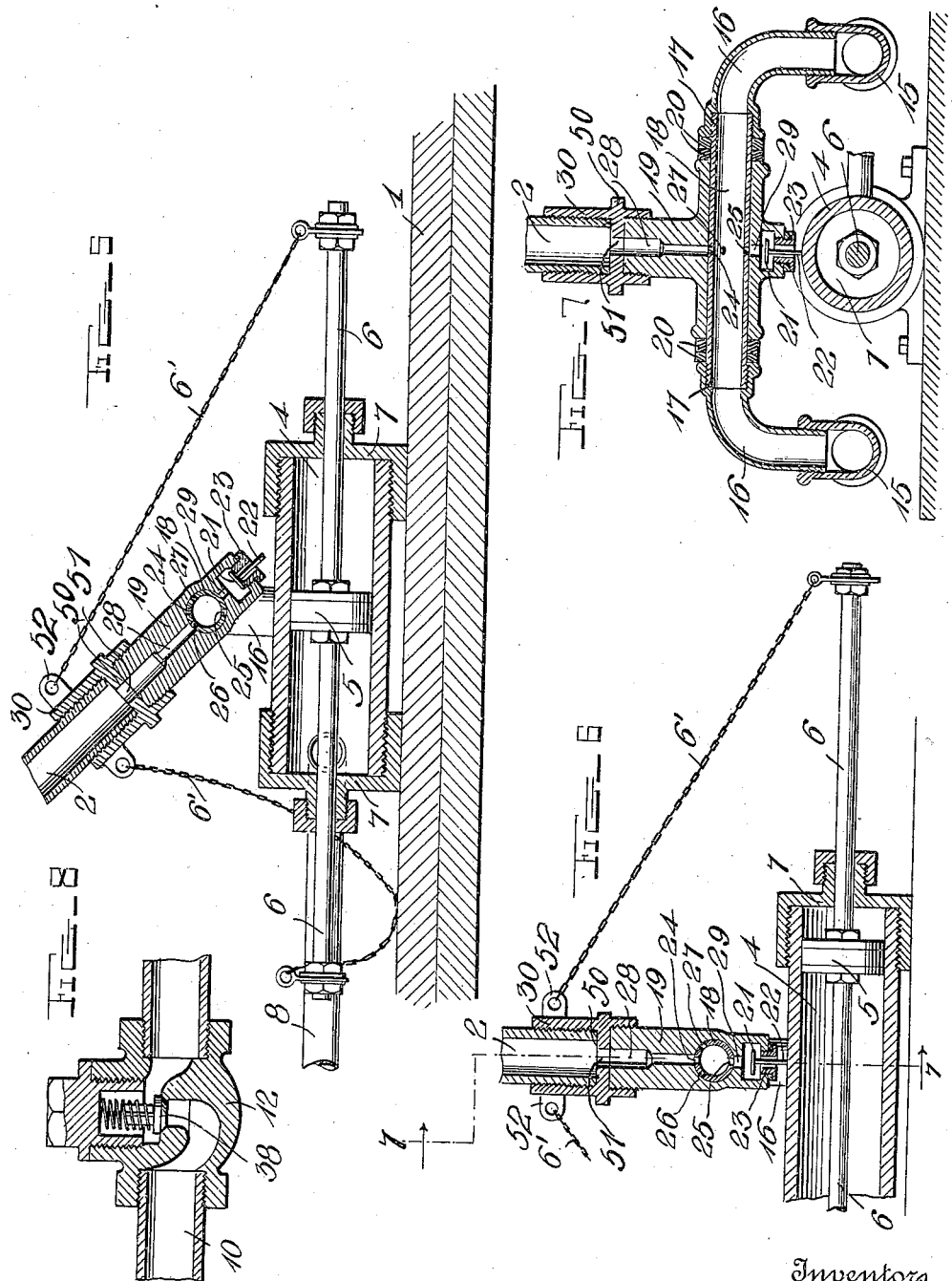
Witnesses
C. H. Griesbauer
Inventors
A. A. Strange
and W. Anderson
by H. B. Willson & Co
Attorneys

UNITED STATES PATENT OFFICE.

AYERS A. STRANGE AND WILLIAM ANDERSON, OF MEMPHIS, TENNESSEE; SAID ANDERSON ASSIGNOR OF ONE-HALF OF HIS RIGHT TO SAID STRANGE.

TROLLEY-POLE-OPERATING MEANS.

991,039.          Specification of Letters Patent.      Patented May 2, 1911.

Application filed August 12, 1909. Serial No. 512,593.

*To all whom it may concern:*

Be it known that we, AYERS A. STRANGE and WILLIAM ANDERSON, citizens of the United States, residing at Memphis, in the county of Shelby and State of Tennessee, have invented certain new and useful Improvements in Trolley-Pole-Operating Means; and we do declare the following to be a full, clear, and exact description of the invention, such as will enable others skilled in the art to which it appertains to make and use the same.

This invention relates to a pressure controlled means for operating trolley poles whereby the trolley wheel is held in contact or engagement with a trolley wire by pressure but is permitted to fall out of the path of the guy and suspending wires or other parts of the track equipment, when the trolley wheel becomes disengaged with the trolley wire.

With the foregoing and other objects in view, the invention consists of certain novel features of construction, combination and arrangement of parts as will be more fully described and particularly pointed out in the appended claims.

In the accompanying drawings, Figure 1 is a plan view of a trolley pole and operating means therefor embodying the present improvements; Fig. 2 is an elevation thereof with the trolley pole in operative position; Fig. 3 is a plan view; Fig. 4 is a detail central longitudinal section on the line 4—4 of Fig. 3, with the trolley pole lowered. Fig. 5 is a similar view with the trolley pole partly raised in trolley wire engaging position. Fig. 6 is a similar view with the trolley pole entirely raised. Fig. 7 is a transverse section taken on the line 7—7 of Fig. 6, and Fig. 8 is a longitudinal section on the line 8—8 of Fig. 3.

In the embodiment illustrated, the numeral 1 indicates a support upon which the trolley pole and operating means are preferably mounted, 2 the trolley pole and 3 the trolley wheel. The operating means comprises a cylinder 4 which is fixedly mounted upon the support 1. A piston 5 is arranged in the cylinder and is provided at opposite ends with stems 6 which extend through the cylinder heads 7. Fluid supply pipes 8 lead to the opposite ends and opposite sides of the cylinder 4 and are connected by a two-way connection 9 with pipe sections 10 and 11, respectively, the former screwing into the outer ends of check valve casings 12 and the latter leading to pressure tanks 13 or other source of fluid pressure, indicated in dotted lines in Fig. 1 and preferably located beneath the car, and being provided with cut-off valves 14. The inner ends of the valve casings 12 screw into the inner ends of two-way connections 15 into which are, in turn, screwed the lower ends of elbows 16, the inner ends of the elbows screwing upon the oppositely threaded ends 17 of a hollow supporting pipe 18. A valve casing 19 is revolubly mounted upon the supporting pipe 18 and is held in a central position thereon by spacing washers 20 arranged between the ends of the casing and the inner ends of the elbows 16, the lower end of the valve casing carrying an upwardly opening check valve 21 having a stem 22 projecting through and below a cap 23 screwing into the lower end of said casing.

The hollow supporting pipe 18 is provided with a pair of central vertical alined upper and lower ports or openings 24 and 25, respectively, and with radially inclined ports 26 and 27, respectively, at opposite sides of its upper opening 24. The valve casing is provided with a pair of vertically alined upper and lower ports 28 and 29, respectively, the purpose of which will be hereinafter disclosed. The hollow trolley pole 2 is connected at its lower extremity to the threaded junction member 30 secured to the stem of the rotatable valve casing 19 which is provided with a spacing wall 50 having a central aperture 51 therein communicating with the port 28 in said valve casing. The hollow trolley pole 2 is closed at its upper end by an apertured cap 33 and forms a cylinder having a piston 31 arranged therein and a coiled spring 32 arranged between the piston and said cap 33, as shown. The outer end of the piston rod 31' projects through the cap 33 and is connected to a cylindrical cap 34 fitting upon the outer or upper end of the trolley pole. In the outer end of the cap 34, is provided a tubular washer 35 in which is secured the threaded shank 36 of the trolley wheel bearing 37, which carries the usual trolley wheel 33, herein before referred to. The junction member 30, as herein shown, is provided with oppositely extending apertured ears or lugs 52 by means of which the trolley pole 2 is connected with the slidable piston rod 6 through the chains or like flexible elements 6'. The check valve casings 12 are equipped with spring pressed check valves 38 which prevent back flow of any compressed air that passes into the hollow supporting pipe 18.

In the operation of the device, assuming that the car is to travel to the right before starting the car, the valve 14 at the left is opened to permit the passage of a pressure fluid to the left hand end of the cylinder 4 which causes the piston 5 to move toward the right and through the medium of the chain 6' raise the trolley pole. When the trolley pole has been raised at a sufficient angle to bring the port 28 of the valve casing 19, to which the trolley pole is connected, into registration with the port 26 of the hollow supporting pipe 18, the fluid also passes into the trolley pole which is in the form of a cylinder, as heretofore described and raises the piston 31 against the action of the spring 32 and thus brings the trolley wheel 3 in position to run in contact with the trolley wire. However, should the trolley wheel jump or leave the trolley wire the air pressure will move the piston 5 in the cylinder still farther to the right which will bring the trolley pole into substantially a vertical position, whereby the stem 22 of the check valve 21 will engage the top of the cylinder 4 when the compressed air in the trolley pole and supporting pipe will be permitted to pass out of the openings or ports 24 and 25 of the hollow supporting pipe and ports 28 and 29 of the valve casing 19 through the check valve 21 when the coiled spring 32 will cause the piston to move downwardly in the trolley pole and thus lower the trolley wheel below the guy or suspending wires of the track equipment. It will be understood, of course, that when the car is to travel to the left, the valve at the right hand side is opened to admit the pressure fluid into the right hand end of the cylinder, thereby moving the piston 5 and the piston rod 6 toward the left to elevate the trolley pole 2 through the chain 6', it being understood that the trolley pole would be lying in the opposite direction to that shown in Fig. 4. When the trolley pole has been elevated to a sufficient angle, the fluid will enter the cylindrical pole through the port 27 in the hollow supporting pipe 18 and raise the piston 31 and the trolley pole secured thereto against the tension of the spring 32 until the trolley wheel is in contact with the trolley wire. When, however, the trolley wheel should jump or leave the wire the valve 21 will be operated to release the air within the cylindrical pole and allow the trolley pole to be automatically retracted.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described our invention, what we claim as new and desire to secure by Letters-Patent is:

1. In a device of the class described, a cylinder, a piston slidable therein, means for conducting a fluid under pressure to said cylinder to move said piston, a hollow trolley pole pivotally mounted adjacent the cylinder, means connecting the trolley pole to be moved by said piston, a second piston mounted within the trolley pole, a trolley wheel carried by said second piston, means arranged to resist the outward movement of the last mentioned piston, and means for admitting the pressure fluid into the trolley pole to move the last mentioned piston.

2. In a device of the class described, a cylinder, a piston slidably mounted therein, means for conducting a pressure fluid to the cylinder to move said piston, a hollow trolley pole pivotally mounted adjacent the cylinder, means arranged between the piston and trolley pole to swing the trolley pole upon the movement of the piston, a second piston slidably mounted within the trolley pole, a trolley wheel carried by said second piston, a spring arranged to resist the outward movement of said piston, and means for admitting the pressure fluid into the trolley pole when the latter has been elevated to a predetermined angle.

3. In a device of the class described, a cylinder, a piston movable therein having a piston rod, means for conducting a pressure fluid within the cylinder to move said piston, a hollow trolley pole pivotally mounted adjacent the cylinder, a connecting means between the piston rod and the trolley pole to elevate the trolley pole upon the movement of the piston, a piston slidably mounted within the trolley pole and carrying a trolley wheel, and means for admitting the pressure fluid within the trolley pole to actuate said piston when the trolley pole has been elevated to a predetermined angle.

4. In a device of the class described, a cylinder, a piston movable therein, means for conducting a pressure fluid to the cylinder to move said piston, a hollow trolley pole pivotally mounted upon the cylinder, flexible connecting means between the piston and trolley pole whereby the trolley pole may be elevated upon the movement of the piston, a second piston within the trolley pole, a trolley wheel carried by said second piston, means arranged within the trolley pole to resist the outward movement of the last mentioned piston, means for admitting the pressure fluid into the trolley pole to actuate said last mentioned piston when the trolley pole has been elevated to a predetermined angle, and means for permitting the escape of the pressure fluid from said trolley pole when the latter has been elevated to a vertical position.

5. In a device of the class described, a cylinder, a piston slidable in the cylinder having piston rods extending in opposite directions therefrom, a hollow trolley pole mounted to swing adjacent the cylinder, means connecting each of the piston rods with the trolley pole whereby the trolley pole may be elevated upon the movement of the piston, a spring controlled piston slidably mounted in the trolley pole, a trolley wheel carried by said piston, means for conducting a pressure fluid to the opposite ends of the cylinder to move the first-mentioned piston in either direction, means for automatically admitting the pressure fluid into the trolley pole to move the last-mentioned piston when the trolley pole has been elevated to a predetermined angle, and means for permitting the release of the pressure fluid within the trolley pole when the latter has been swung to a vertical position.

6. In a device of the class described, a pivotally mounted trolley pole, means for elevating the trolley pole to any desired angle, a piston slidaby mounted within the trolley pole, a trolley wheel carried by said piston, a spring arranged to resist the movement of said piston, means for automatically admitting a fluid under pressure into the trolley pole to elevate said piston, and means for automatically permitting the escape of the pressure fluid within the trolley pole.

7. In a device of the class described, a pivotally mounted trolley pole, means for swinging the trolley pole upon its pivot to any desired angle, a spring controlled piston slidably mounted within the trolley pole, a trolley wheel carried by the piston, means for automatically admitting a pressure fluid into the trolley pole when said trolley pole has been elevated to a predetermined angle to actuate said piston, and a valve arranged in the trolley pole to permit the escape of the fluid within the trolley pole when said trolley pole has been elevated to a vertical position.

8. In a device of the class described, a source of fluid pressure, pipes leading therefrom, a hollow trolley pole, a hollow ported pole supporting bracket communicating with the pipes from the source of fluid pressure, a ported rotatable connection between the trolley pole and supporting bracket to permit flow to and from the pole, a piston slidable within the trolley pole, a trolley wheel carried by said piston, and means operated by the fluid pressure to elevate the trolley pole to allow the passage of the fluid pressure into the said trolley pole, substantially as described.

9. In a device of the character described, the combination of a cylinder, a piston slidably mounted therein, a source of fluid pressure, a supporting pipe communicating with said source and arranged transversely over the cylinder and having a pair of vertical alined ports and side ports at opposite sides of the upper vertical ports, a valve casing revolubly mounted on said pipe and having a pair of alined ports adapted to register with the vertical alined ports of the pipe when the trolley pole is in vertical position, the upper port of the casing being adapted to register with one of the side ports in the pipe when the trolley pole is at a predetermined angle, a hollow trolley pole carried by the valve casing and having its bore in alinement with the ports in the casing, a piston in the trolley pole, a trolley wheel carried by the piston, connections between the trolley pole and the first-mentioned piston, and a check valve at the lower end of the valve casing to permit the escape of the fluid pressure when in alinement with the vertical ports in the supporting pipe.

10. In a device of the class described, a cylinder, a piston slidable therein having a piston rod, pipes for conducting a pressure fluid within said cylinder to move said piston, valves arranged in said pipes for controlling the pressure fluid, a hollow trolley pole pivotally mounted upon the cylinder, means connecting the trolley pole with the piston rod whereby the trolley pole will be swung upwardly upon the movement of said piston, a spring controlled piston within the trolley pole, a trolley wheel carried by said piston, means whereby a pressure fluid may be admitted within the trolley pole to actuate said last-mentioned piston, and means whereby the pressure fluid is permitted to escape from the trolley pole when the latter swings beyond the wire engaging position.

In testimony whereof we have hereunto set our hands in presence of two subscribing witnesses.

AYERS A. STRANGE.
WILLIAM ANDERSON.

Witnesses:
WILLIAM A. SMITH,
G. W. THOMPSON.

Copies of this patent may be obtained for five cents each, by addressing the "Commissioner of Patents, Washington, D. C."